(12) United States Patent
Finn et al.

(10) Patent No.: US 6,857,276 B2
(45) Date of Patent: Feb. 22, 2005

(54) TEMPERATURE CONTROLLER MODULE

(75) Inventors: John Finn, North Wales, PA (US);
Renfeng Gao, Phoenixville, PA (US);
Renyuan Gao, Wayne, PA (US);
Joseph Chang, North Wales, PA (US)

(73) Assignee: Photon-X, LLC, Malvern, PA (US)

( * ) Notice: Subject to any disclaimer, the term of this patent is extended or adjusted under 35 U.S.C. 154(b) by 0 days.

(21) Appl. No.: 10/337,902

(22) Filed: Jan. 8, 2003

(65) Prior Publication Data

US 2003/0154726 A1 Aug. 21, 2003

Related U.S. Application Data

(60) Provisional application No. 60/346,737, filed on Jan. 8, 2002.

(51) Int. Cl.[7] ............................. F25B 21/02; F25D 15/00
(52) U.S. Cl. ..................... 62/3.7; 62/259.2; 165/104.15
(58) Field of Search .................. 62/3.7, 3.2, 259.2; 165/104.15; 372/34, 26, 38

(56) References Cited

U.S. PATENT DOCUMENTS

| | | | |
|---|---|---|---|
| 4,950,268 A | 8/1990 | Rink | |
| 5,334,826 A | 8/1994 | Sato et al. | |
| 5,602,860 A | * 2/1997 | Masonson | 372/34 |
| 5,636,233 A | 6/1997 | Sato et al. | |
| 5,675,600 A | 10/1997 | Yamamoto et al. | |
| 5,690,849 A | * 11/1997 | DeVilbiss et al. | 62/3.7 |
| 5,694,409 A | 12/1997 | Taguchi | |
| 5,970,184 A | 10/1999 | Katoh et al. | |
| 6,002,696 A | 12/1999 | Ohishi et al. | |
| 6,021,143 A | 2/2000 | Ransijn et al. | |
| 6,055,252 A | 4/2000 | Zhang | |
| 6,101,200 A | * 8/2000 | Burbidge et al. | 372/34 |
| 6,144,788 A | 11/2000 | Ang et al. | |

* cited by examiner

*Primary Examiner*—Chen Wen Jiang
(74) *Attorney, Agent, or Firm*—Min, Hsien & Hack, LLP

(57) ABSTRACT

A temperature controller module for electronically controlling the temperature of a device, such as a pump laser or laser diode, controls the device temperature based on low heat dissipation inductors and current sources. The temperature controller module shuts off the thermoelectric cooler when the temperature of the laser exceeds a predetermined amount. Further, the temperature controller module is integrated in a compact, self-contained modular form to allow use in space critical applications.

17 Claims, 4 Drawing Sheets

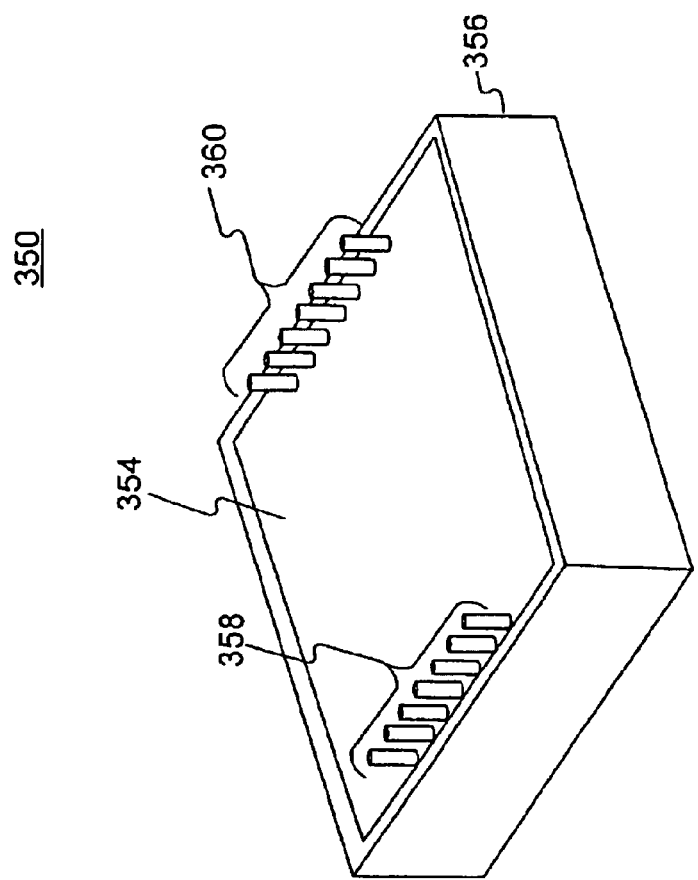
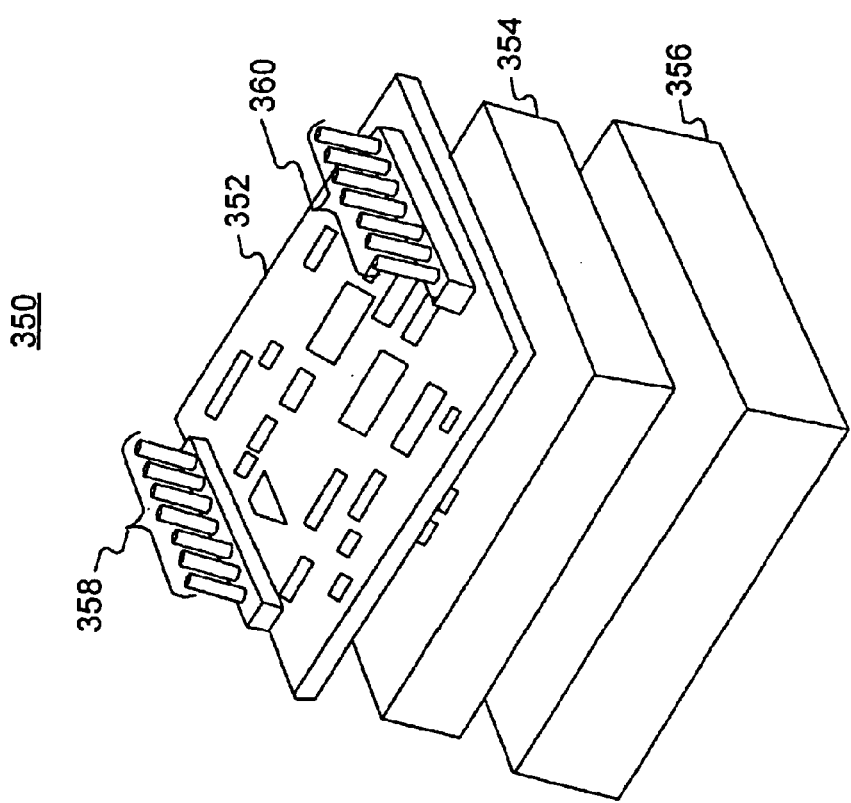
Fig. 3(b)
Fig. 3(a)

TEMPERATURE CONTROLLER MODULE

RELATED APPLICATIONS

The present application is related to and claims the benefit of U.S. Provisional Application No. 60/346,737 filed Jan. 8, 2002, in the names of RENFENG GAO, RENYUAN GAO, JOHN FINN, and JOSEPH CHANG, the entire contents of which are relied on and fully incorporated herein by reference.

GOVERNMENT LICENSE RIGHTS

The U.S. Government has a paid-up license in this invention and the right in limited circumstances to require the patent owner to license others on reasonable terms as provided for by the terms of Contract No. N00014-00C-0117 awarded by the U.S. Navy.

FIELD OF THE INVENTION

The present invention relates generally to the control of active components, and more particularly to a method and system for controlling the temperature of devices, such as lasers and laser diodes, by using low heat dissipation current sources with low heat dissipation inductors integrated into a single temperature controller module.

BACKGROUND OF THE INVENTION

Presently, controlling the temperature of devices, such as semiconductor devices, based on thermoelectric cooling is applied to a wide range of devices and systems. For example, in optical communication systems it is important to monitor and control the temperature of devices so they remain operational and do not cause damage to other components. Such devices may include laser diodes, semiconductor optical amplifiers, erbium doped optical amplifiers, optical wavelength division multiplexers, and fiber Bragg gratings. A thermoelectric cooler (TEC) may be used to perform the function of cooling such devices. In addition, TECs are used in applications in many industries and fields, including biomedical devices, semiconductor microelectronic devices, and devices involving aerospace applications.

A TEC may be operated by a controller that drives the TEC. The operation of the controller for the TEC may rely on feed-back loop based electronic drivers that provide a controlled electrical current injection to the TEC. Generally, designing analog control loops for active optical devices involves the use of power operational amplifiers and power transistors. However, using power operational amplifiers and transistors has several drawbacks. For example, their use is costly. Second, power operational amplifiers and power transistors use a large amount of printed circuit board area. Therefore, it is inefficient to use these devices in applications where space is critical such as, for example, in telecommunications systems, pump laser controllers, continuous wave distributed feedback (CW DFB) laser controllers, Bragg gratings, temperature controllers, heater element controllers, thermoelectric controllers, L band drivers, C band drivers, S Band drivers, Raman amplifier controls, and semiconductor optical amplifier (SOA) driver controls. Third, using power operational amplifiers and power transistors gives rise to thermal inefficiencies, which may lead to the degradation of the components of the application. Since many applications using temperature controllers require low power consumption as well as compact size, the existing hardware is difficult to integrate into these applications. It is therefore desirable to provide a temperature controller module for lasers, laser diodes, and others of the above mentioned components, that overcomes the above described problems and disadvantages of present systems.

SUMMARY OF THE INVENTION

There is provided a method for electronically controlling a temperature of a device. A variable current is supplied to a cooler, which provides heat transfer away from the device. The temperature of the device is determined. An amount of current to be supplied to the cooler in response to the device temperature is determined. The device temperature is compared against a predetermined temperature range. The cooler is supplied with the determined amount of current by at least one current source when the device temperature is within the first predetermined temperature range and the current is sufficiently blocked to render the cooler inoperable if the device temperature is outside the predetermined temperature range. Each current source is further coupled to at least one inductor.

There is also provided a system for electronically controlling a temperature of a device by providing a current to a temperature regulating element. The system comprises a temperature detector to produce a signal representative of the device temperature; a driver to determine an amount of current, in response to the signal, to be supplied to the temperature regulating element; and a temperature controller, including at least one current source and at least one associated inductor, to provide the current in response to the determination by the driver.

There is also provided a system for electronically controlling a temperature of a device by providing a variable current to a cooler. The system comprises a temperature detector to produce a signal representative of the device temperature; a cooler driver, responsive to the signal, to determine an amount of current to be supplied to the cooler; and a temperature controller, coupled to the cooler driver and including at least one current source, to provide the determined amount of current to the cooler. The determined amount of current varies in response to the signal and is provided to the cooler when the current source is enabled and is sufficiently blocked to render the cooler inoperable when the current source is disabled.

There is also provided a system for electronically controlling a temperature of a device. The system comprises a cooler coupled to receive a current; a temperature monitor to detect a temperature of the device; a temperature detector to produce a signal representative of the device temperature; a cooler driver to determine an amount of current to be received by the cooler in response to the signal; a temperature controller, including at least one current source, each current source further coupled to at least one inductor, to supply the determined amount of current if the device temperature is within a predetermined temperature range and to sufficiently block current to the cooler to render the cooler inoperable if the device temperature is outside the predetermined temperature range. The current source is a monolithic step down regulator.

Additional features and advantages will be set forth in part in the description which follows, and in part will be obvious from the description, or may be learned by practice of the claims. The features and advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings:

FIG. 3(a) is an exploded view of a module for electronically controlling the temperature of a device consistent with the invention.

FIG. 3(b) is another view of the module for electronically controlling the temperature of a device shown in FIG. 3(a).

It is to be understood that both the foregoing general description and the following detailed description are exemplary and explanatory only and are not restrictive of the invention, as claimed.

DETAILED DESCRIPTION

Figure 1:
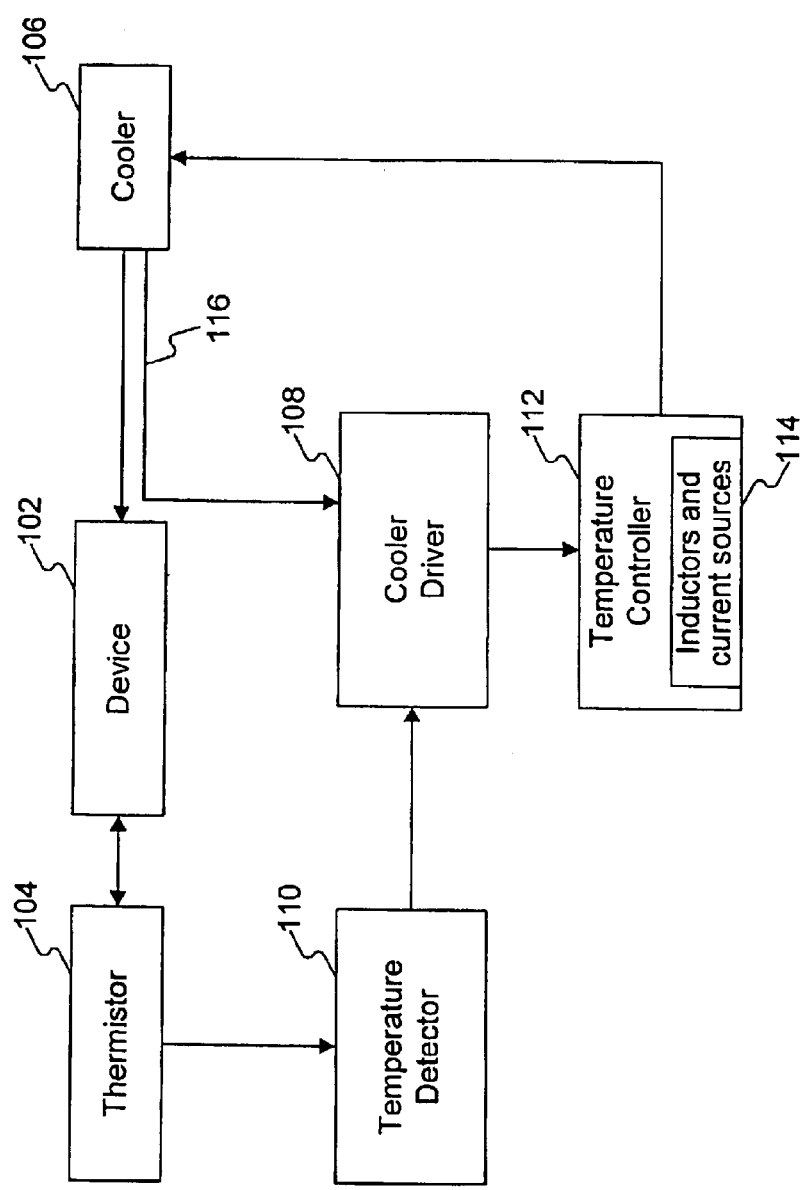
FIG. 1 is a block diagram of a system for electronically controlling the temperature of a device consistent with the invention.

Referring now to the drawings, in which the same reference numbers will be used throughout the drawings to refer to the same or like parts, FIG. 1 is a block diagram of a system 100 for electronically controlling the temperature of a device. System 100 may include a device 102, for example a 980 nm pump laser diode, a thermistor 104, to monitor and detect the temperature of device 102, and a cooler 106, to provide heat transfer away from device 102. System 100 may also include a cooler driver 108, to determine an amount of driving current to be supplied to cooler 106, and a temperature detector 110, to detect and produce a signal in accordance with and as a function of the temperature of device 102. System 100 may also include a temperature controller 112, which allows current to be supplied to cooler 106 or sufficiently blocks current to cooler 106 to render cooler 106 inoperable. System 100 may further include a connection 116, which provides a connection to cooler driver 108 to form a closed loop feedback section between cooler 106, cooler driver 108, and temperature controller 112. Further, temperature controller 112 may include low heat dissipation inductors and current sources 114.

In the operation of system 100, thermistor 104 monitors and detects the temperature of device 102. Thermistor 104 includes a variable resistance that varies as a function of temperature. The variation in resistance is used to vary a voltage that represents the temperature of device 102. This function of monitoring the temperature can also be performed and implemented by other devices such as a semiconductor-type sensor that varies a voltage as a function of temperature. Thermistor 104 is coupled to detector 110, so that detector 110 can detect the temperature of device 102 and produce a signal representative of the temperature of device 102. The signal output of detector 110 is provided to cooler driver 108, which supplies current to cooler 106, through temperature controller 112, for operation of cooler 106 to transfer heat away from device 102. Cooler 106 can, for example, be a thermoelectric cooler (TEC) with a maximum required current of 1.40 A. When system 100 is implemented with a TEC having the maximum required current of 1.40 A, cooler driver 108 and cooler 106 can be designed to maintain the temperature of device 102 at a near constant temperature of +25° C.+/−1° C. The temperature value and tolerance can also be user defined values that can be adjusted in cooler driver 108.

Temperature controller 112 receives the temperature signal output by detector 110 through cooler driver 108 and compares the temperature with a predetermined temperature range. The predetermined temperature range is selected so that system 100 operates within a predetermined specified limit. Responsive to the temperature signal, temperature controller 112 allows or reduces or blocks current from being supplied to cooler 106. Current is reduced or blocked from being supplied to cooler 106 to prevent damage to cooler 106 resulting from, for example, excessive drive current to cooler 106 to compensate for a high device temperature. Further, separate circuitry, not shown in FIG. 1, may be provided to protect device 102 from damage due to excessive temperature. Normally, current to cooler 106 is reduced or blocked when the temperature of device 102 exceeds an upper limit of the predetermined range, for example 50° C. However, in accordance with alternative designs and circumstances, it may be appropriate to shut down system 100 in the event the temperature drops below a lower limit of the predetermined temperature range, for example 0° C. Thus, temperature controller 112 can serve as a protective thermal shutdown circuit. The selection of the predetermined temperature range depends upon the particular operational characteristics and specifications of device 102 and cooler 106. For example, if device 102 is a 980 nm pump laser, the predetermined temperature range can be between 0° C. and 50° C. If the temperature is outside the predetermined temperature range, temperature controller 112 prevents the operation of cooler 106. Specifically, if the temperature is outside the predetermined temperature range, temperature controller 112 sufficiently reduces or blocks the drive current to cooler 106 to render cooler 106 inoperable. Conversely, if the temperature is within the predetermined temperature range, temperature controller 112 allows the supply of sufficient current for operation of cooler 106.

Temperature controller 112 contains circuitry constructed of components including inductors and current sources 114, which provide a magnitude of current to cooler 106 depending on a determination by cooler driver 108 indicating a required current magnitude as a function of the temperature of device 102. If the temperature of device 102 is within the predetermined temperature range, the circuitry of temperature controller 112 is enabled and provides current to cooler 106 in response to and in accordance with the determination made by cooler driver 108. If the temperature of device 102 is outside the predetermined temperature, the circuitry of temperature controller 112 sufficiently reduces or blocks the current passing to cooler 106 to render cooler 106 inoperable.

As previously mentioned, cooler 106 provides heat transfer away from device 102 and is driven by current supplied from temperature controller 112 as determined by cooler driver 108. Optionally, cooler 106 may also be coupled, using connection 116, to cooler driver 108 to form a closed loop feedback section to cooler driver 108. Connection 116 enables a quicker response time by cooler driver 108 and temperature controller 112 to adjust to temperature changes in device 102 and allows for a more compact design.

Figure 2:
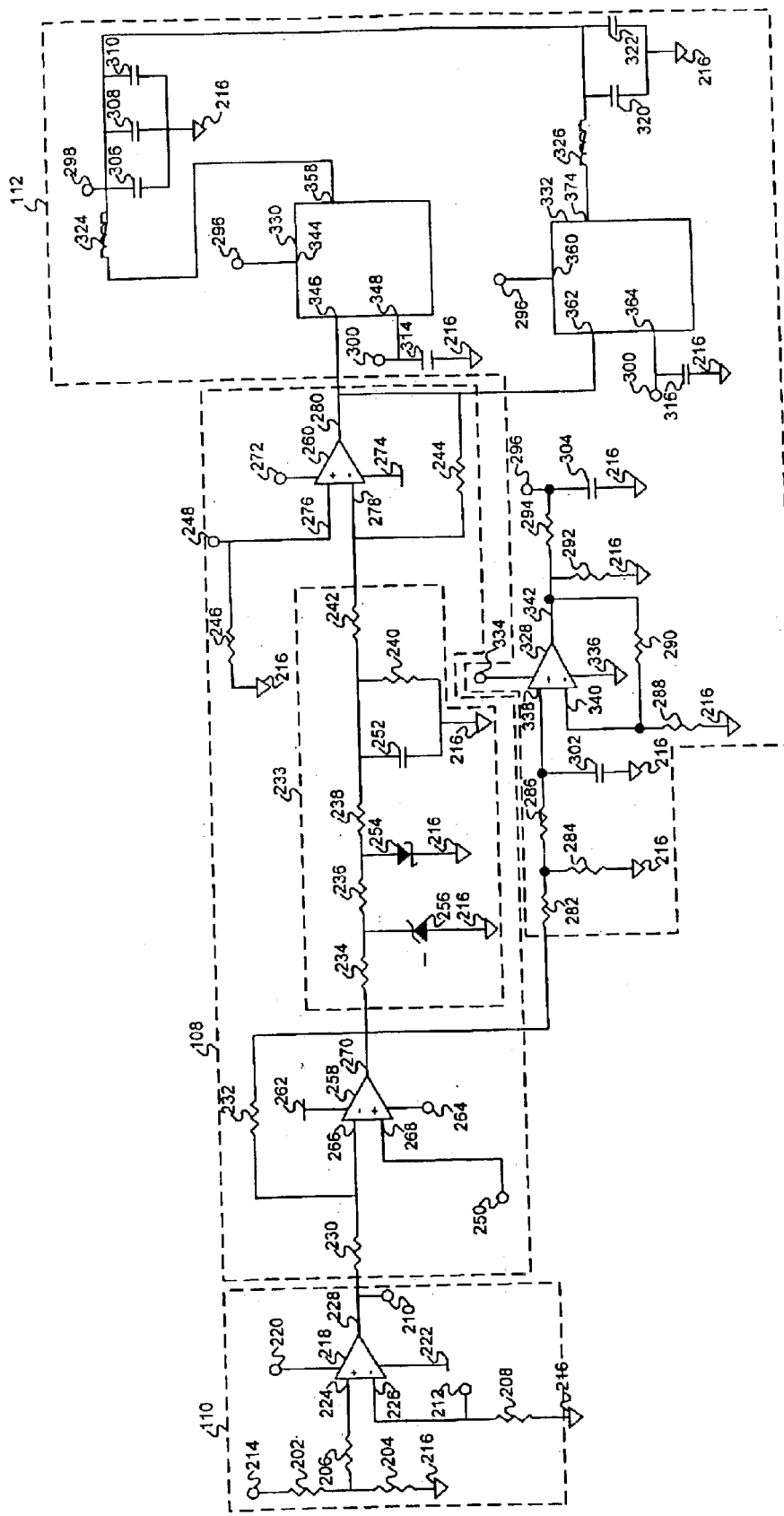
FIG. 2 is a circuit diagram illustrating features of elements shown in FIG. 1.

FIG. 2 is a circuit diagram illustrating features of elements shown in FIG. 1. Referring to FIG. 2, detector 110 may include resistors 202, 204, 206, and 208, leads 210 and 212, a voltage supply connection 214, a common connection 216, and an amplifier 218. Resistors 202 and 204 are connected in series between voltage supply connection 214 and common connection 216 to form a voltage divider circuit. Amplifier 218 may further include power supply connections 220 and 222, inputs 224 and 226, and an output 228.

Non-inverting input 224 of amplifier 218 is connected through resistor 206 to a node between resistors 202 and 204. Inverting input 226 of amplifier 218 is connected to common connection 216 through resistor 208. Amplifier 218 is used as a non-inverting amplifier with a fixed voltage reference at common connection 216. Thermistor 104 may be connected between leads 210 and 212 to form a feedback gain section using a variable resistance included as part of thermistor 104. As the detected temperature varies, the variable resistance varies as well, thereby creating a signal on output 228 that is a function of the detected temperature.

Cooler driver 108 may include common connection 216, resistors 230, 232, 244, and 246, a limiting circuit 233, leads 248 and 250, and amplifiers 258 and 260. Limiting circuit may include common connection 216, resistors 234, 236, 238, 240, 242, a capacitor 252, and diodes 254 and 256. Amplifier 258 may further include supply connections 262 and 264, inputs 266 and 268, and an output 270. Amplifier 260 may include power supply connections 272 and 274, inputs 276 and 278, and an output 280. Resistor 230 is coupled between output 228 of amplifier 218 and inverting input 266 of amplifier 258. Resistor 232 is coupled to form a feedback section between output 270 and input 266. Non-inverting input 268 of amplifier 258 may be coupled to lead 250, which can be coupled to a voltage divider circuit of a fixed voltage reference so that a user can define an input voltage to amplifier 258 through input 268. Resistors 234, 236, 238, and 242 are connected, in series, between output 270 of amplifier 258 and inverting input 278 of amplifier 260. Diode 256 is coupled between common connection 216 and a node between resistors 234 and 236. Diode 254 is coupled between common connection 216 and a node between resistors 236 and 238. Capacitor 252 is coupled in parallel with resistor 240 between common connection 216 and a node between resistors 232 and 242. Non-inverting input 276 of amplifier 260 is coupled to common 216, through resistor 246. Further, lead 248 is coupled to input 276. Resistor 244 is coupled between inverting input 278 and output 280 of amplifier 260.

Temperature controller 112 may include resistors 282, 284, 286, 288, 290, 292, and 294, leads 296, 298, and 300, capacitors 302, 304, 306, 308, 310, 314, 316, 320, 322, inductors 324 and 326, an amplifier 328, and current sources 330 and 332. Amplifier 328 further includes supply connections 334 and 336, inputs 338 and 340, and an output 342. Current source 330 may include inputs 344, 346, 348, and an output 358. Current source 332 may include inputs 360, 362, 364, and an output 374. Resistor 282 is coupled to output 270 of amplifier 258 and in series with resistor 286. Resistor 286 is further coupled to non-inverting input 338 of amplifier 328. Resistor 284 is connected at a node between resistors 282 and 286, and capacitor 302 is connected to non-inverting input 338. Resistor 284 and capacitor 302 are further connected to common connection 216. Inverting input 340 of amplifier 328 is connected to common connection 216 through resistor 288. Resistor 290 is connected between input 340 and output 342 of amplifier 328, forming a feedback section. Resistor 294 is connected in series between output 342 and lead 296. Resistor 292 is connected at a node between output 342 and resistor 294. Capacitor 304 is connected to lead 296. Resistor 292 and capacitor 304 are further coupled to common connection 216. Current sources 330 and 332 can be monolithic step-down regulators of a type known in the art. For example, if monolithic step down regulators are used current sources 330 and 332, inputs 344 and 360 represent an enable (or RUN) connection, inputs 346 and 362 represent a feedback voltage connection (VFB), and inputs 348 and 364 represent an input voltage connection (VIN). Inputs 344 and 360 are further connected to lead 296. Inputs 346 and 362 are connected to output 280 of amplifier 260. Inputs 348 and 364 are connected to common connection 216 through capacitors 314 and 316, respectively, and are input voltage connections to current sources 330 and 332. Outputs 358 and 374 are coupled to inductors 324 and 326, respectively. Inductor 324 is further connected to inductor 326. Capacitors 306, 308, 310, 320, and 322 are connected in parallel at a node between inductors 324 and 326. Capacitors 306, 308, 310, 320, and 322 are further coupled to common connection 216. Lead 298 is connected at a node between inductors 324 and 326.

In the operation of system 100, detector 110 monitors and detects the temperature of device 102 and produces a signal that is a function of the detected temperature. Specifically, thermistor 104 is coupled to amplifier 218 to form a feedback gain section, for example by connecting thermistor 104 between leads 210 and 212. The variable resistance of thermistor 104 changes in a predictable manner to allow amplifier 218 to produce a signal on output 228 that is a scaled voltage based on the variable resistance. Resistors 202, 204, 206, and 208 can be selected by the user in order to create a signal on output 228 that is representative of detected temperature and will comply with operational specifications of system 100. Also, common connection 216 can be connected to amplifier 218 in the manner shown by FIG. 2. Common connection 216 can be ground (0V). Amplifier 218 can be semiconductor operational amplifier as understood by those skilled in the art. For example, in order to produce a signal on output 228 representative of the detected temperature using supply connection 220 as 5V and supply connection 222 as −2V, resistor 202 can be 20 KΩ, resistor 204 can be 3 KΩ, resistor 206 can be 10 KΩ, and resistor 208 can be 470Ω.

Cooler driver 108, in conjunction with temperature controller 112, provides an adjustable current in order to drive cooler 106 in response to the temperature of device 102. If it is desired to lower the temperature of device 102, an amount of current corresponding to that amount of cooling will be supplied to cooler 106. Output 228 is coupled to input 266 on amplifier 258 of cooler driver 108 in order to provide the signal on output 228, representative of the detected temperature of device 102, to cooler driver 108. Amplifier 258 can be implemented as a difference amplifier. For example, the signal on input 266 may have a scaled voltage based on the variable resistance of thermistor 104, which is representative of the detected temperature of device 102. Lead 250 is connectable to a user-defined voltage source to enable the user to scale the output of amplifier 270 according to the desired application. Lead 250 can be coupled to a voltage divider circuit which derives its source voltage from a fixed voltage reference. For ordinary applications, lead 250 can be coupled to a fixed voltage reference. Therefore, if the difference between input 266 and input 268, coupled to lead 250, is large, then there will be a corresponding increase in the driving current supplied to cooler 106. If there is a small variation in the difference voltage, then the corresponding value for the drive current supplied to cooler 106 will be small. Thus, on output 270 of amplifier 258 there may be a signal representative of the temperature of device 102 that may be at a corresponding level to drive cooler 106, i.e., a signal value that varies as a function of the temperature of device 102 sufficient to drive cooler 106 at an appropriate level. Operating cooler driver 108 as a function of the difference between two voltages, e.g., the difference between the voltage representative of the temperature of device 102 and voltage representative of lead 250, rather than a single control voltage, allows for better rejection of voltage fluctuations and random elevated noise levels from extraneous offset values.

To further reject noise and voltage fluctuations, amplifier 258 is coupled to limiting circuit 233. Limiting circuit 233 serves to filter out undesirable voltage fluctuations to amplifier 260, so that the fluctuations do not damage amplifier 260 or cooler 106. Limiting circuit 233 may use Schottky diodes for diodes 254 and 256. For example, to limit voltages outside the range of 0V to 1.3V, resistors 234 and 236 can be 3 K$\Omega$, resistor 238 can be 10 K$\Omega$, resistor 240 can be 4.7 K$\Omega$, and resistor 242 can be 51 K$\Omega$, diodes 256 and 258 can be 30V Schottky diodes with a 1.22 voltage reference, and capacitor 252 can be 0.33 $\mu$F.

Limiting circuit 233 is coupled to inverting input 278 of amplifier 260. Therefore, amplifier 258 outputs a signal on output 270 that is received by amplifier 260 after being filtered for voltage fluctuations and noise. The signal received by amplifier 260 determines the amount of current that should be supplied to cooler 106. Cooler 106 can be connected between lead 248 of cooler driver 108 and lead 298 of temperature controller 112. This will create a closed loop feedback section, between cooler driver 108 and temperature 112, using cooler 106. The signal fed back to cooler driver 108 is a voltage feedback signal that uses cooler 106 as a resistive load. To maintain the temperature at a near constant 25° C.+/−.1° C., while connecting power supply connections 264 and 272 to 5V and connecting power supply connections 262 and 274 to −1.2V, resistor 230 can be 10 K$\Omega$, resistor 232 can be 39K, resistor 244 can be 300 K$\Omega$, and resistor 246 can be 0.2.

Temperature controller 112 functions to block or reduce the current supplied to cooler 106 if the detected temperature is outside of the predetermined temperature range. Temperature controller 112 renders the cooler inoperable if the temperature of device 102 is outside of the predetermined temperature range. The extent of the predetermined temperature range may be determined by operational specifications of device 102 or cooler 106 (e.g., for a 980 nm pump laser, the predetermined temperature range can be 0° C.–50° C.). Also, one of ordinary skill in the art may now appreciate that in alternative designs, temperature controller can be coupled to shutdown not only cooler 106, but also system 100 if the temperature of device 102 is outside the predetermined temperature range.

As previously described, output 270 of amplifier 258 is coupled to temperature controller 112 through amplifier 328. Amplifier 328 can be a comparator, wherein the signal on its input 338 received from output 270 of amplifier 258 is compared against the predetermined temperature range. The predetermined temperature range can be selected by a user so that the current driving cooler 106 is reduced or blocked to render cooler 106 inoperable in the event the temperature of device 102 is outside the predetermined temperature. To implement amplifier 328, various resistance values and capacitor values can be selected by the user to represent the predetermined temperature range. For example, for a predetermined temperature range of 0° C.–50° C., such as may be suitable for a 980 nm pump laser, power supply connection 334 can be connected to 5V and power supply connection 336 can be connected to common connection 216, resistor 282 can be 1 M$\Omega$, resistor 284 can be 100 K$\Omega$, resistor 286 can be 5.6 M$\Omega$, resistor 288 can be 8.2 K$\Omega$, resistor 290 can be 100 K$\Omega$, resistor 292 can be 51 K$\Omega$, resistor 294 can be 300 K$\Omega$, capacitor 302 can be 10 $\mu$F, capacitor 304 can be 1.0 $\mu$F, and supply connection 334 can be 5V.

One purpose of amplifier 328 is to output a signal on output 342 which indicates whether current should be supplied to cooler 106 or whether current should be reduced or blocked to render cooler 106 inoperable. Lead 296 is connected to output 342 for this purpose. Lead 296 is also coupled to current sources 330 and 332 to enable current sources 330 and 332 if the temperature of device 102 is within the predetermined temperature range or disable current sources 330 and 332 when the temperature of device 102 is outside the predetermined temperature range. When enabled, current sources 330 and 332 can allow current to pass to cooler 106. However, when disabled, current sources 330 and 332 reduce or block current to drive cooler 106, rendering cooler 106 inoperable. If current is to be supplied to cooler 106, the amount of current is determined by amplifier 260, as previously described. Inputs 348 and 364 of current sources 330 and 332, respectively, are voltage inputs which can be supplied by the user through lead 300. This supplied value can be a fixed reference of 0V. Inductors 324 and 326 are coupled to lead 298 which may be connected to a positive input of cooler 106. Lead 298 may also be connected to the parallel combination of capacitors 306, 308, 310, 320, and 322 all having the value of 10 $\mu$F.

Current sources 330 and 332 can be current sources assembled in a parallel configuration to supply a cooling element, such as cooler 106, with an appropriate amount of DC current. The appropriate amount of DC current may be controlled by amplifier 260, as previously described. Current sources 330 and 332 may contain monolithic synchronous step-down switching regulators each capable of supplying 700 mA. The internal synchronous switches of current sources 330 and 332 increase efficiency and eliminate the need for large components dissipating a large amount of power. For example, the use of internal synchronous switches can obviate the need for power transistors. Power transistors dissipate a large amount of power and their use leads to a larger, more costly circuit than using current sources 330 and 332. Also, current sources 330 and 332 can incorporate a constant frequency, current mode step-down architecture. The values of inductors 324 and 326 are selected so that the current from current sources 330 and 332 remains continuous during burst periods at low load currents.

Current sources 330 and 332 are optimized for high efficiency at low load currents. This enables current sources 330 and 332 to maintain better than 90% efficiency over their lifetime. When current sources 330 and 332 are operating normally, efficiency increases as load current increases. Nominal efficiencies can range from 60% at 1 mA to approximately 90% at 700 mA output current. Because each current source may operate from a 0.8 volt reference and incorporates a near 100% duty cycle internal oscillator, it can also provide low dropout voltage operation. Such operation also serves to improve efficiency and thereby lowers power consumption requirements.

FIG. 3(a) is an exploded view of a module 350 for electronically controlling the temperature of a device. Module 350 includes a circuit board 352, a resin layer 354, and a housing 356. Board 352 may be an implemented version of cooler driver 108, detector 110, and temperature controller 112 of system 100 that can be interconnected on a printed circuit board as typically used in the art. Board 352 may also include pin sets 358 and 360, which may be hardware equivalents to leads 210, 212, 248, 250, 296, 298, 300 as well as common connection 216 and connections to +5V, +1.2V, and −1.2V voltage supplies.

Board 352 can be placed into housing 356, with resin 354 introduced into housing 356 to cover and encapsulate the components on board 352. Resin 354 can be a type of semiconductor packaging resin typically found in the art, which is introduced and hardens to protect board 352 within housing 356. The result is the view of module 350 as shown in FIG. 3(b) which is the result of mounting,board 352 within housing 356 and introducing resin 354. As also shown in FIG. 3(b), pin sets 358 and 360 protrude from resin 354 and housing 356. Pin sets 358 and 360 can be used to insert system 350 into a printed circuit board for electronically cooling a semiconductor device. Housing 356 may have dimensions of 1.4 inches by 1.4 inches and a height of 0.310 inches. Board 352 may have dimensions of 1.250 inches by 1.250 inches and can be attached to housing 356 by means typically used in the art. Pin sets 358 and 360 may extend 0.230 inches from housing 356 and are circuit connections for board 352 to other circuit components. Module 350 may be implemented with smaller dimensions of housing 356, e.g., 1 inch by 1 inch with a height of 0.2 inches.

Using current sources 330 and 332 with inductors 324 and 326 results in less heat being generated by the operation of cooler driver 108, detector 110, and temperature controller 112 than by conventional use of power transistors. Due to the low heat generation, integrating cooler driver 108, detector 110, and temperature controller 112 into a single, compact module, such as module 350, is possible.

Figure 4:
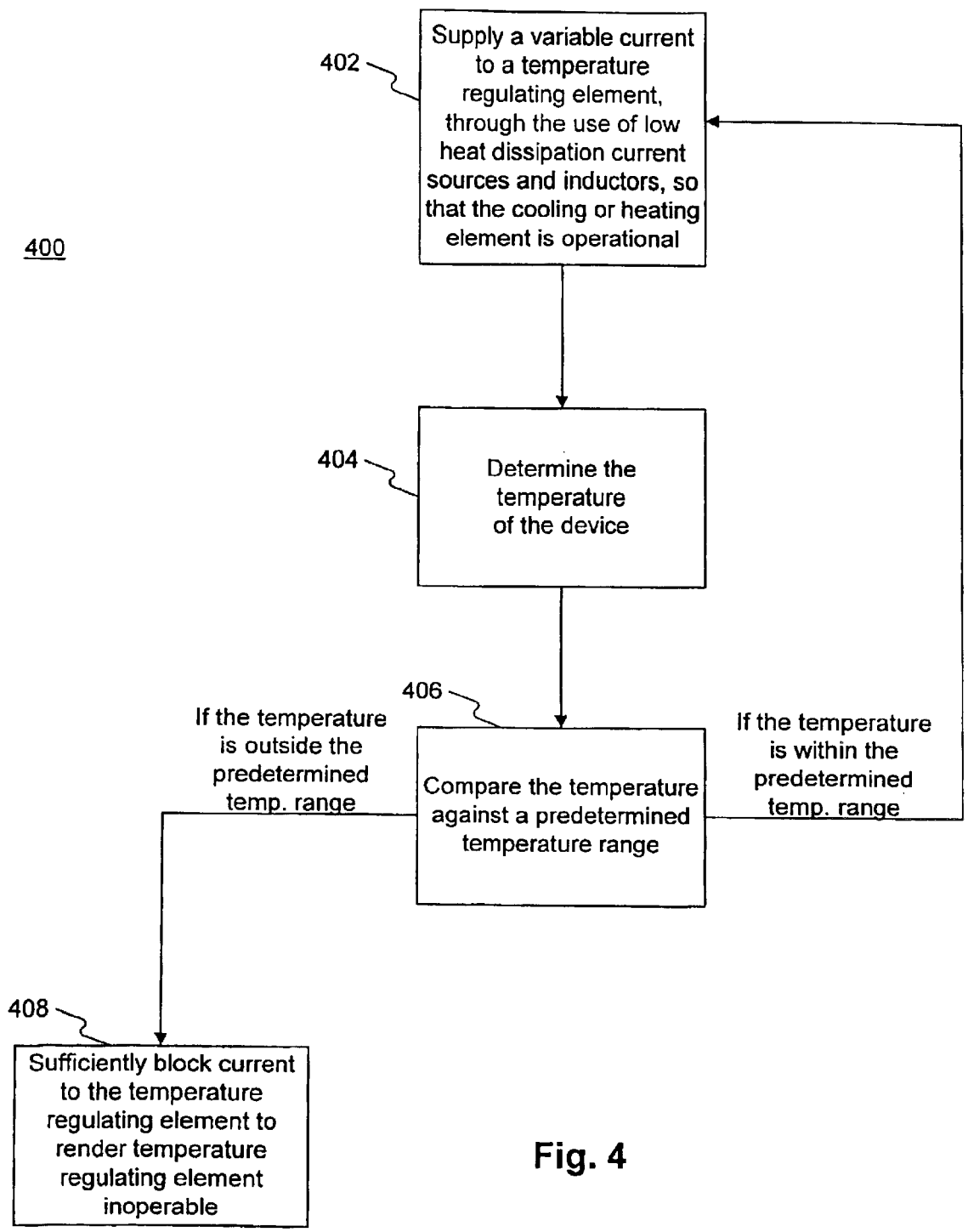
FIG. 4 is a flowchart illustrating a method for electronically controlling the temperature of a device consistent with the invention.

FIG. 4 is a flowchart 400 of a method for electronically controlling the temperature of a device. The method for electronically controlling the temperature of a device begins at stage 402, where a current is supplied to a temperature regulating element. The current is supplied using low heat dissipation current sources that work in conjunction with low heat dissipation inductors. The current may be variable depending upon the temperature of the device. The temperature of the device is determined at stage 404 using a sensor that varies a voltage as a function of temperature, such as a thermistor. At stage 406, the temperature of the device is compared against a predetermined temperature range, e.g., a desired operating range selected by the user. Two outcomes may arise from stage 406. At stage 408, the current is sufficiently blocked from the temperature regulating element if the temperature of the device is outside the predetermined temperature range. Operating the temperature regulating element when the temperature of the device is outside the predetermined temperature range may cause damage to the temperature regulating element because of excessive drive current. If the temperature of the device is within the predetermined temperature range, the current sources and inductors continue to provide current to the temperature regulating element, with the amount of current being controlled according to the detected temperature of the device.

Although FIGS. 1–4 mainly illustrate electronically controlling the temperature of device through the use of coolers, it will now be appreciated by those in the art that the above teaching can also be applied to heating elements or any other element that may be used to regulate temperature.

Other embodiments will be apparent to those skilled in the art from consideration of the specification and practice of the claims disclosed herein. It is intended that the specification and examples be considered as exemplary only, with a true scope and spirit being indicated by the following claims.

What is claimed is:

1. A system for electronically controlling a temperature of a device by providing a current to a temperature regulating element, the system comprising:

a temperature detector to produce a signal representative of the device temperature;

a driver to determine an amount of current, in response to the signal, to be supplied to the temperature regulating element; and a temperature controller, including at least one current source, to provide the current in response to the determination by the driver;

wherein the current is provided to the temperature regulating element when the current source is enabled and is sufficiently blocked to render the temperature regulating element inoperable when the current source is disable; and wherein the current source is enabled when the device temperature is within a predetermined temperature range and is disabled when the device temperature is outside the predetermined temperature range.

2. The system of claim 1, wherein the predetermined temperature range is 25° C.+/−1° C.

3. A system for electronically controlling a temperature of a device by providing a current to a temperature regulating element, the system comprising:

a temperature detector to produce a signal representative of the device temperature;

a driver to determine an amount of current, in response to the signal, to be supplied to the temperature regulating element; and a temperature controller, including at least one current source, to provide the current in response to the determination by the driver;

wherein the temperature controller is disposed between the driver and the temperature regulating element and comprises a plurality of current sources, wherein the plurality of current sources are coupled in parallel to the driver.

4. The system of claim 3, wherein the system is integrated into a self-contained module.

5. The system of claim 4, wherein the current source is a monolithic step down regulator.

6. The system of claim 4, wherein the module has a length that is between 1 inch and 1.4 inches, a width that is between 1 inch and 1.4 inches, and a height that is between 0.2 inches and 0.31 inches.

7. A system for electronically controlling a temperature of a device by providing a variable current to a cooler, the system comprising:

a temperature detector to produce a signal representative of the device temperature;

a cooler driver, responsive to the signal, to determine an amount of current to be supplied to the cooler; and a temperature controller, coupled to the cooler driver and including at least one current source and at least one inductor, to provide the determined amount of current to the cooler;

wherein the determined amount of current varies in response to the signal and is provided to the cooler when the current source is enabled and is sufficiently blocked to render the cooler inoperable when the current source is disabled;

wherein the current source is enabled when the device temperature is within a predetermined temperature range and is disabled when the device temperature is outside the predetermined temperature range.

8. The system of claim 7, wherein the predetermined temperature range is 25° C.+/−1° C.

9. The system of claim 7, wherein the system is integrated into a self-contained module.

10. The system of claim 9, wherein the current source is a monolithic step down regulator.

11. The system of claim 9, wherein the module has a length that is between 1 inch and 1.4 inches, a width that is between 1 inch and 1.4 inches, and a height that is between 0.2 inches and 0.31 inches.

12. A system for electronically controlling a temperature of a device by providing a variable current to a cooler, the system comprising:

a temperature detector to produce a signal representative of the device temperature;

a cooler driver, responsive to the signal, to determine an amount of current to be supplied to the cooler; and a temperature controller, coupled to the cooler driver and including at least one current source and at least one inductor, to provide the determined amount of current to the cooler;

wherein the determined amount of current varies in response to the signal and is provided to the cooler when the current source is enabled and is sufficiently blocked to render the cooler inoperable when the current source is disabled;

wherein the temperature controller is disposed between the cooler driver and cooler and comprises a plurality of current sources, wherein each of the current sources is coupled to the cooler driver and coupled in parallel to the other current sources.

13. A system for electronically controlling a temperature of a device, comprising:

a cooler coupled to receive a current;

a temperature monitor to detect a temperature of the device;

a temperature detector to produce a signal representative of the device temperature;

a cooler driver to determine an amount of current to be received by the cooler in response to the signal; and a temperature controller, including at least one current source, each current source further coupled to at least one inductor, to supply the determined amount of current if the device temperature is within a predetermined temperature range and to sufficiently block current to the cooler to render the cooler inoperable if the device temperature is outside the predetermined temperature range;

wherein the current source is a monolithic step down regulator.

14. A method for electronically controlling a temperature of a device, comprising:

supplying a variable current to a cooler, the cooler providing heat transfer away from the device;

determining the temperature of the device;

determining the amount of current to be supplied to the cooler in response to the device temperature;

comparing the device temperature to a predetermined temperature range; and permitting the cooler to be supplied with the determined amount of current by at least one current source when the device temperature is within the first predetermined temperature range and sufficiently blocking the supply of current to the cooler to render the cooler inoperable if the device temperature is outside the predetermined temperature range, wherein each current source is further coupled to at least one inductor.

15. The method of claim 14, further including providing the cooler as a thermoelectric cooler.

16. The method of claim 14, further including providing the predetermined temperature range as 25° C.+/−1° C.

17. The method of claim 14, further including providing the current source as a monolithic step down regulator.

* * * * *